United States Patent [19]

Millar et al.

[11] 4,027,366

[45] June 7, 1977

[54] MULTILAYER COATED SUBSTRATE

[75] Inventors: John M. Millar, Joppa; William F. Moran, Randallstown, both of Md.

[73] Assignee: Beatrice Foods Co., Chicago, Ill.

[22] Filed: May 9, 1975

[21] Appl. No.: 576,111

Related U.S. Application Data

[60] Continuation of Ser. No. 384,895, Aug. 2, 1973, abandoned, which is a division of Ser. No. 107,559, Jan. 18, 1971, Pat. No. 3,770,482.

[52] U.S. Cl. .............................. 428/623; 428/212; 428/218; 428/323; 428/327; 428/328; 428/413; 428/418; 428/457; 428/461; 428/523

[51] Int. Cl.² ...................... B23P 3/00; B32B 7/02; B32B 15/08

[58] Field of Search .......... 428/212, 418, 413, 461, 428/457, 411, 323, 328, 327, 523, 218; 117/71 M, 71 R, 93.4 R, 217, 218, 232; 29/195 P; 427/27, 25, 26

[56] References Cited

UNITED STATES PATENTS

| | | | |
|---|---|---|---|
| 2,958,611 | 11/1960 | Ulrich | 428/336 |
| 3,140,195 | 7/1964 | Nagel | 427/185 |
| 3,397,046 | 8/1968 | Greyson | 29/195 |
| 3,505,099 | 4/1970 | Neuroth | 428/450 |
| 3,708,321 | 1/1973 | Spieles | 427/29 |

*Primary Examiner*—Ellis Robinson
*Attorney, Agent, or Firm*—Murray and Whisenhunt

[57] ABSTRACT

A process for electrostatically applying a multilayered coating on a substrate in one operation or step is disclosed, wherein a mixture of powders of at least two different coating materials is used as the coating composition, each powder, in the case of non-conducting powders, differing from the others in dielectric constant by a factor of at least 0.1, and the powders being of substantially different specific gravities, with the components having the lowest dielectric constant value having the lowest specific gravity value.

At least one of the powders will be a powder of a film-forming non-conductive organic or inorganic polymer. Upon electrostatically applying a coating of this powdered composition to a conductive substrate which has a neutral charge or a charge opposite from that of the coating composition powder particles, the powders stratify into distinct layers of different compositions. The powders adhere to the substrate because of contact or static electrification for a reasonable length of time and until at least one of the powders can be cured or fused to form the final coating.

Thus, for instance, in only one pass with an electrostatic spray gun, a protective coating of superimposed layers of zinc, epoxy, and polyethylene can be applied to a conductive substrate.

10 Claims, No Drawings

MULTILAYER COATED SUBSTRATE

This is a continuation of application Ser. No. 384,895, filed Aug. 2, 1973, now abandoned, which is a Rule 60 division of application Ser. No. 107,559, filed Jan. 18, 1971, now U.S. Pat. No. 3,770,482.

BACKGROUND OF THE INVENTION

The electrostatic spraying of powders, and the electrostatic fluidized bed deposition of powders, has been known to the art. The process of electrostatically spraying powders generally involves establishing an electrical field, within a spray gun or other apparatus, which is capable of charging the powder particles. The charge on the particle directs and causes the particle to deposit on the desired object, and in many cases a complete uniform coating is obtained over the entire object, even though the electrostatic spray gun is directed towards only one face thereof.

The electrical charge given to a particle during electrostatic coating may be represented by the following general formula:

$$q = kE_z a^2$$

wherein $k$ is a factor which depends upon the nature and the shape of the particle, $E_z$ is the electric field in the charging zone, and $a$ is the average radius of the particle.

The electric charge thus is dependent upon the field intensity ($E_z$) and on the surface area (and therefore the radius) of the particle. The smaller the particle size, the higher the electrical charge in relation to the particle mass (and the mass is proportional to $a^3$). Each charged particle during the electrostatic coating, e.g., spraying, operation is subjected to an electrostatic force $F = qE$, with $E$ being the electric field existing around such particle at a given moment.

With the electrostatic spraying technique, the powder is charged and adheres to a heated or an unheated substrate for a period generally sufficient to permit conveying the coated object to an oven. A subsequent bake, or curing, process in the oven transforms the powder into a smooth, uniform coating having desired characteristics. Some of the main advantages of the electrostatic spraying process are the fact that no solvents are used, and therefore no solvent costs are involved and the coating operation is much safer. Generally, any excess powder can be recovered from the spray booth and reused, which, together with the fact that very little overspray is encountered, results in almost negligible powder loss. In many situations, a coating of appreciable thickness can be built up in a single operation, as compared to the need in conventional paint operations, to use several coatings to produce the same thickness.

The prior art has been unable to apply, through electrostatic means, a layer of a conductive material, e.g. a conductive metal such as zinc, as the conductivity of the powder results in a shorting of the electrostatic apparatus. Therefore, the prior art, when wishing to apply superimposed layers of various materials including at least one conductive material, has applied such layers separately, with a nonelectrostatic application means being used to apply the conductive material.

Besides being unable to apply layers of conductive materials, the prior electostatic methods of coating have suffered another distinct disadvantage in the application of a plurality of coatings to a substrate, with baking between the coating steps. Such plural coating operations have generally produced a resulting coating having a plurality of layers with such poor adhesion between the different layers that delamination may occur.

The prior art has utilized mixtures of polymeric materials, e.g., thermosetting polymers, and certain powdered metals for decorative effects. For instance, furniture manufacturers frequently electrostatically spray a mixture of powdered epoxy resin and powdered, flaked aluminum or bronze, the powder mixture containing about 2% by weight of metal, on furniture. In both cases, the metal migrates during the baking operation to the surface of the coating, providing an attractive metallic finish.

French Pat. No. 1,261,473 relates to the electrostatic spraying of a polymer such as a cellulose ester. The patent discloses that powdered aluminum may be added to the plastic powder to improve the chargeability thereof. However, the French patent makes no mention of the amount of aluminum powder added to the cellulose ester or polyethylene powder, and it is clear that the patentee must be contemplating relatively small amounts of powdered aluminum, as very small amounts of the finely powdered aluminum should be sufficient to change the chargeability of the polymeric powder. In addition, even relatively low amounts of powdered aluminum, e.g. ½ or 1% by weight of the total composition, would result in migration of aluminum to the surface of cellulose ester coatings during the bake cycle. To avoid this metallic top coat, it is believed clear that the French patent must be concerned with very small amounts of powdered aluminum.

DESCRIPTION OF THE INVENTION

This invention relates to a process for electrostatically applying a multilayer coating to substrates in one step. The coating comprises a plurality of superimposed, distinct layers of film-forming materials. These film-forming materials are electrostatically applied in admixed powder form, with the electrostatic coating apparatus applying a charge to the powders, which, when the substrate is charged (the substrate may be neutral), is opposite the charge of the substrate.

According to the invention, a conductive substrate is electrostatically coated with a mixture of at least two different powders, each powder having an average particle size of less than about 300 microns. At least one of the powders is a powder of a film-forming non-conductive organic or inorganic polymer. The entire powder mixture coating composition may consist of different film-forming non-conductive organic or inorganic polymers, or one or more components of the coating composition may be a conductive metal or a conductive non-metal. Preferably, at least one material in the coating composition is highly conductive. Because of the charge differential between the different powders, the powders are preferentially attracted to the substrate during the electrostatic coating operation, with the material having the greatest charge generally being found adjacent the substrate, and the material having the smallest charge appearing on the outer surface of the coating. It is extremely difficult to accurately measure particle charges, but an approximation of the chargeability of a particular non-conductive material will be furnished by its dielectric constant.

Two or more powders may be utilized in the coating composition of this invention, provided that the powders of non-conductive materials differ from one another in dielectric constant by a factor of at least 0.1. When mixtures of film-forming non-conductive organic and/or inorganic polymers are utilized to produce discrete layers of such polymers, the polymers having the higher dielectric constant value must have a specific gravity which is substantially higher, e.g., at least 0.1 higher, than that of the polymer having the lower dielectric constant value. On the other hand, when the coating composition is a mixture of said conductive metals and such non-conductive polymers, the conductive metal should have a specific gravity which is at least three times, preferably four times, that of the non-conductive polymer. Conductive non-metals may also be used in the curing compositions of this invention, and, when used in admixture with such non-conductive polymers, should have a specific gravity of at least 1.5 times that of the non-conductive polymer.

Although it has not yet been conclusively established, it appears that the powders used in the coating compositions of this invention form a triboelectric series, e.g., the powders acquire different amounts or degrees of electrostatic charge under similar charging conditions. In the case of dielectric powders, such powders appear to obey Coehn's Law, wherein powders of higher dielectric constant values are more strongly charged than powders of lower dielectric constant values. In the case of conductive metals and conductive non-metals, the charging mechanism may be more appropriately described in terms of conductivity. For instance, it appears that, when a plurality of conductive metals and/or conductive non-metals are used in the coating composition of this invention, such conductive materials should differ from one another, in conductivity by a factor of at least about $10^4$ or thereabouts. In any event, the powders used in the compositions of this invention appear to form a series in which the members of such series may be ranked in an order in which the members become increasingly electrophilic.

After the powdered coating composition is applied to the substrate, with the formation of stratified layers of different powders adhering to the substrate because of the electostatic charge, the coated substrate is subjected to a treatment to render the coating composition powders immobile. Such treatment generally results in the fusion of at least one of the coating components, e.g., a thermoplastic polymer, and/or in a chemical treatment or reaction such as to effect at least a partial cure or conversion of at least one of the coating components, e.g., a thermosetting polymer.

The coating components must have the above differential in dielectric constant values, or chargeability, in order to initially form superimposed layers when applied by electrostatic coating methods. Thereafter, and in accordance with normal electrostatic coating procedures, the substrate, with the charged particles of the coating composition adhering thereto, is placed in a bake oven until the coating composition is transformed, by curing or fusion, into an integral coating. During this fusion or curing process, the material having the highest dielectric constant, which will generally be deposited in a layer adjacent the substrate, may migrate through other coating components to the surface of the coating if of a similar or lower specific gravity than of the upper layers (those furthest from the substrate). The present invention does not contemplate substantial migration of coating components during the fusion or curing process; therefore, it is necessary to maintain the specific gravities of the coating components within the aforesaid ranges in order to prevent substantial migration of one or more coating components.

Normally, the coating compositions of the present invention will utilize 2 or 3 different components, to produce a resulting 2 or 3 layer coating on the substrate. It will, of course, be realized that one component or one final layer in the coating may be itself a mixture of two or more specific materials — e.g., two or more thermoplastic polymers having quite similar dielectric constants and quite similar specific gravities. When 3, 4, 5 or even more distinct coating components are utilized to produce 3, 4, 5 or even more layers in the final coating, each of the components should differ from the other components by the differentials set forth above as to dielectric constant, or chargeability, and specific gravity. When a plurality of non-conductive organic polymers are utilized, the specific gravity of each polymer should differ from the specific gravities of the other polymers by a factor of at least 0.1, preferably by a factor of 0.2.

The substrate may be of any conductive metal, e.g., iron, steel, copper, aluminum and the like, or may be a conductive non-metal, e.g. carbon, or even may be of a non-conductive material, e.g., a wooden, glass or organic hydrocarbon polymer, which has been rendered at least partially conductive on at least the surface thereof, e.g., by the application of a conductive coating thereon. Such a conductive coating could be, for instance, colloidal graphite or silver. Such substrates are hereinafter referred to as "conductive substrates".

In one electrostatic coating operation, e.g., by spraying or in a fluidized bed, the powder particles will be charged, with the charge being either positive or negative, depending upon the equipment utilized and, to some extent, the particular nature of the powder itself. For instance, it has been found preferable to impart a positive charge to nylon powders. In any event, the substrate should be neutral or of a charge opposite to the powder to insure that the powder particles will adhere to the substrate until the subsequent heat treatment, baking, fusing or curing operation is completed. The substrate may be merely grounded, in some instances, or an opposite charge may be applied thereto. It will be generally realized, of course, that the greater the differential in charge between the powder particles and the substrate, the greater will be the adhesion thereinbetween, and more material can be applied in a given pass of a spray gun, for instance, or in a given time of immersion in a fluidized bed. In any event, the differential between the charges on the powder particles and on the substrate should be at least sufficient to allow the particles to adhere to the substrate during normal handling operations between the electrostatic coating operation and the bake oven.

One major advantage of the present invention is in the reduction of atmospheric pollutants and liquid polluting effluents from coating operations. Previous procedure for producing coatings of different components resulted in the discharge of appreciable quantities of polluting materials into the environment, which discharges are reduced or even eliminated by the present invention.

It is generally necessary to choose a particle size for the powders which is not too small in order to provide a surface sufficiently large to receive the electric charge. On the other hand, it is generally wise not to choose too large a particle diameter for the powders because such large diameters generally produce coatings which are not uniformly smooth. The average particle size of the polymeric materials in the powder admixture will generally be within the range of 10 to 70 microns, preferably 20 to 50 microns, and most preferably will average about 35 microns in size for electrostatic spraying applications. For other types of electrostatic powder applications, different powder sizes will accordingly be used, as known to the art. For example, in an electrostatic fluidized bed, polymer powders may be used having particle sizes within the range of 10 to 300 microns.

As mentioned above, it is preferred that at least one powder in the powder admixture be of a highly conductive material. For the highly conductive material, generally a metal, the powder particle size will normally be less than 50 microns, preferably less than 20 microns, and more preferably about 4 to 10 microns in size. With a 4 to 5 micron particle size, at least 4 percent by weight of the metal, e.g. zinc, must be used, or else a discontinuous film of the metal will be produced on the substrate. When using zinc or similar metals, and multiple passes for spraying panels or the like, it is preferred that the zinc comprise no more than about 7½ percent by weight of the powder admixture, preferably less than 6 percent, and most preferably about 5 percent by weight of zinc is used. However, for a single pass coating of a panel or the like, the zinc concentration may go up as high as 20 or even 30 percent by weight of the powder admixture.

The present invention most preferably involves a 3-component coating powder system containing from 4 to 30% of a metal, i.e. zinc, 10–86% of a thermosetting material, i.e. a thermosetting epoxy, and 10–70% of a surface layer material, generally of a thermoplastic nature, e.g. polyethylene or polypropylene. The preferred ranges for the above components are 5–12%, 55–75% and 20–40% respectively, all percentages being by weight of the total composition.

The powders are sprayed while suspended in one or more fluids. Generally, the fluid will be air or other inert gas, but it is possible to use a non-solvent inert liquid in which the coating powders are dispersed. The resulting suspension may be sprayed upon the substrate, and then the non-solvent is removed during the baking operation.

The process of the present invention produces a final coating upon the substrate, with the final coating containing at least two dissimilar superimposed layers. For ease and economy of operation, it is preferred that only one coating composition be applied, with stratification occurring between the various components thereof. When the coating components are applied in only one operation, a considerable cost savings will result. Even more importantly, however, is the fact that a decided improvement in the adhesion between the various coating layers, and, in some cases, between the substrate and the coating layer adjacent thereto, will generally be noted.

It is possible, however, to apply one of the coating composition powders and thereafter apply, before any curing of the first coating layer, a second coating composition containing, for instance, a conductive metal. In such a situation, for instance, wherein a first layer of powdered epoxy is applied to the substrate in one pass, and thereafter a combination of zinc powder and epoxy powder is applied over this first layer, without any curing of the first layer, the metal (zinc) will penetrate through the first layer to the substrate.

While the simple temperature fuse or cure or baking operation is generally preferred, various other methods to cure or set organic polymers, especially thermosetting organic polymers, or other materials in the coating composition, may be utilized if desired. For instance, some polyester resins are now being cured instantaneously through the use of electron beams, as is known to the art, and the results obtained with the simple baking operation suggests that the electron beam process may also be used to cure certain thermosetting polymers. Likewise, the use of organic polymers which are cured by the action of moisture, for instance, the moisture cured urethane systems known to the art, is suggested. Another possibility is using a thermosetting organic polymer, e.g. an epoxy, which has an undercatalyzed cure system therein, with a consequential extended pot life. This type of system could function as a simple type of time cure at room temperatures.

In most coating operations, the thermoplastic and/or thermosetting polymers in the coating composition will be fused or cured into a film. However, in certain situations the formation of a film may be unnecessary and perhaps even undesired. In such situations, it may be necessary only to fuse, for instance, thermoplastic polymer particles to one another. In any event, the curing or heat treating operation to which the coating compositions is subjected after the electrostatic coating step should convert at least one component of the coating composition into a form which adheres the coating composition, after the electrostatic charge is dissipated, on the substrate.

When a single pass spraying operation is utilized, a heated substrate can be utilized. However, a heated substrate is not preferred when multiple spray passes are utilized, as the heat from the substrate can fuse or cure the coating material to the point where no further penetration of various components, e.g. zinc, can be obtained on subsequent passes.

The baking, or curing, temperature may vary widely, depending upon the specific nature, and particle size, of the powders, as known to the art. For instance, generally significantly different temperature conditions will be used for thermosetting polymers as opposed to thermoplastic polymers. Broadly, the curing temperature will be from about 140° F to 1500° F, preferably from 200° F to 750° F. The time required in the bake oven will vary, depending upon the particular temperature utilized, and also depending upon the nature of the powder composition. The curing temperature may be as short as 10 seconds or even less, and may be as long as several days or even more, but generally such longer cure times are not preferred because of slow production rates and adverse costs caused thereby. Preferably, the cure times will vary from about 1 minute to about 1 hour. In any event, the temperature-time relationship should be such as to at least partly fuse the thermoplastic powders and/or to at least partly activate, or cure, the thermosetting powders.

As the coating powder moves, under the influence of air pressure, through and from the electrostatic spray gun, it is charged by passing through a high voltage, low amperage field. The voltage applied to the spray coating apparatus to produce such field may vary widely, although it is generally preferred to utilize as high a voltage as is practicably possible. With the Ransburg electrostatic spray gun utilized in the working examples herein, the applied voltage was 90,000 volts, which is about the maximum that can be applied with that particular electrostatic coating equipment. Lower voltages may be used, e.g. 30,000 volts, although it is generally preferred to use a voltage of at least 60,000 volts. There is no reason why higher voltages cannot be used if the coating equipment is designed for same. Likewise, the pump and motor pressures can vary considerably, but it has generally been found suitable to have these pressures about 10–40 lbs per square inch, preferably 25–30 lbs per square inch. Generally, the only adverse effects noted outside the above ranges will be a slower coating rate and some reduction in flow and in the finish gloss appearance of the film.

While the above preferred description has been in terms of using zinc as one of the powders in the coating composition, and while zinc powders have been used in the working examples hereinafter, it is to be understood that other conductive metal powders can be used in lieu thereof. Among suitable metals are, for instance, iron, stainless steel, zinc, copper, nickel, tin, chromium, brass, titanium, zirconium, lead, alloys of these metals, and the like (e.g. generally ferrous and non-ferrous conductive metals). The coating composition may also contain conductive non-metals, such as graphite, carbon fibers (whiskers), or the like. Various thermoplastic polymers may be utilized, among which may be mentioned, by way of example, polyethylene and copolymers thereof, polypropylene and copolymers thereof, vinyl resins, nylon and other polyamides, acrylic resins, and the like. Among thermosetting polymers which could be used are powders of polymerizable resins (generally resins which are heat-activated or which are used in conjunction with catalysts) such as epoxys, polyurethanes, polycarbonates, acrylics, cross-linkable vinyl polymers and copolymers and the like. When various thermoplastic and thermosetting polymers are utilized, it has been found that the densities thereof are generally fairly close to one another, so application conditions suitable for one polymer will generally be fairly close to those used for another polymer. The coating composition may also contain inorganic polymers such as silicates, e.g., alkali metal silicates, siloxanes and boron polymers. In addition, certain non-conductive metals which can be fused at relatively low temperatures may also be utilized in the coating composition.

As mentioned above, a wide variety of materials may be used in the coating composition of the present invention. However, it is preferred that at least one film-forming non-conductive organic polymer, either thermoplastic or thermosetting, be included in the coating composition, in an amount of at least 10% by weight. It is also preferred that the coating composition contain two or three components, and the remaining components are preferably either other nonconductive organic polymers and/or conductive metals. The coating composition may contain various fillers or reinforcing agents, such as glass flakes or fibers, or sand or other fine form of silica, or various other fillers commonly used in electrostatic spraying operations.

It has unexpectedly been found that aluminum and bronze are not suitable metal powders for the composition of this invention. Aluminum or bronze powders, when applied in a composition at a level or about 2% by weight or more and in conjunction with an organic polymer, will generally form a metallic layer at the substrate interface. However, upon the subsequent application of heat, the aluminum or the bronze will migrate to the coating surface. The exact mechanism of such migration is not now known, but could be caused by a rapid dissipation of charge, by a leafing effect, by a density or specific gravity effect, or a combination of these or other factors. In any event, the present invention does not contemplate the use of aluminum or bronze powders as the sole conductive metal powder in the coating compositions of this invention.

It is possible to blend the coating composition in any desired sequence, although it has generally been found preferable to incorporate catalysts, accelerators, and the like into thermosetting polymers, for instance, before admixing the polymers with other components such as thermoplastic polymers or metal powders.

Broadly, the coating composition of the present invention, which produces a plurality of distinct, superimposed layers of coating material on the substrate, may contain one or several conductive metals or non-metals (as long as the concentration of conductive materials in the final coating composition is such that the electrostatic coating apparatus is not shorted out during operation), one or several thermoplastic polymers, one or several thermosetting polymers, or mixtures thereof. The coating composition must contain at least two dissimilar powders, wherein the dissimilar powders have different dielectric constants or degrees of chargeability. The dielectric constants of the distinct powders, in the case of non-conductive polymers, should vary by at least 0.1 and preferably by at least 0.2. For instance, epoxy resins generally have a dielectric constant in the neighborhood of 4.0, with polyethylene, polypropylene and acrylic resins having dielectric constants of 2.3, 2.75 and 2.5, respectively. In any event, there must be a differential in the charge imparted to the respective powder particles of dissimilar coating materials for the process of the present invention to work. As previously mentioned, the powder may be given either a negative or a positive charge, with the use of a negative charge generally preferred, with the exception of certain polymers, e.g. nylon, to which a positive charge will preferentially be applied, as known to the art.

EXAMPLE I 70 parts by weight of a black epoxy powder, 30 parts by weight of a clear polyethylene powder, 5 parts by weight of zinc dust and 0.15 parts by weight of colloidal silica were dry blended at room temperature until a homogeneous blend was obtained.

The black epoxy powder (hereinafter sometimes called Black Epoxy Powder No. 3) had the following composition:

| | | |
|---|---|---|
| Shell EPON 1004, an epichlorhydrin-bisphenol A resin | 72% | by weight |
| Dicyanamide | 2% | " |
| Dow XD - 3540.03 amine accelerator | 2% | " |
| Barium sulfate (filler) | 23% | " |
| Carbon black | 1.8% | " |
| Monsanto PC 1344, a low molecular weight | | |

-continued

| | | |
|---|---|---|
| silicone oil defoamer | 0.2% | " |

The epoxy powder ingredients were dispersed in a high intensity dry blender, thereafter extruded at a temperature of 185° -200° F, and then reduced to a powder in a hammer mill. The resulting powder had the following particle size analysis:

| | |
|---|---|
| Less than 37 micron | 0.6% |
| 38–44 micron | 0.7% |
| 45–74 micron | 4.2% |
| 75–150 micron | 94.5% |
| 151–300 micron | 0.41% |
| Over 301 micron | 0.1% |

The Shell EPON 1004 had a Durran softening point of 95–105, a viscosity (in 40% solution in Butyl Carbitol) of 4.6–6.6 poises, an epoxide equivalent (grams of resin containing one gram-equivalent of epoxide) of 875–1025, an epoxide equivalent/100 grams of 0.11, and a hydroxy equivalent/100 grams of 0.34. The Dow amine accelerator XD 3540.03 was a free flowing white powder having a total nitrogen content of 63.6% by weight.

The clear polyethylene powder, produced by U.S. Industries under the trademark "Microthene FN 510" had an average particle size of 12 microns and a density of 0.924. The polyethylene appeared to agglomerate with the colloidal silica (which had a particle size of 0.2 microns which seemed to aid in the chargeability of the polyethylene particles.

The zinc dust (New Jersey Zinc No. 64) was of galvanizing purity and had an average particle size of 4.8 microns. The zinc dust contained 95.7% metallic zinc, 4.2% ZnO, 0.04% Pb, 0.04% Cd, and less than 0.01% Fe. 99.7% of the particles passed through a 325 mesh screeen.

The above blended powder composition was sprayed, using a Ransburg Model 322/8446 R-E-P Electrostatic Spray Gun, upon a mild steel panel (6 inches by 12 inches by ¼inch) which had been pretreated by shot blasting to provide a 1 mil profile (roughness). The spraying was conducted at 78° F and 40% RH. The voltage applied across the throat of the gun was 90,000 volts and the air pump and the motor pressures of the spray gun were 30 lbs each. The steel panel was grounded, and the spray gun was maintained approximately 8 inches from the panel during spraying. An effort was made to maintain only single pass conditions of spraying, with the spray time of approximately 4 seconds, producing an overall coating of about 2 mils on the panel.

Thereafter, the panel was carefully removed from the spray booth and placed in a bake oven, with an effort made to keep from disturbing the powder adhering to the panel. The oven was maintained at 300° F for 3 minutes and thereafter the temperature was raised, at a linear rate, for 10 minutes until the oven temperature was 420° F. At that point, the panel was removed from the oven and allowed to cool. After cooling, the panel had a generally flat finish, with an essentially clear coat on top overlying a black underlayer. Zinc could not be visibly detected on the coating surface.

The coating was scratched and indented and then examined under a microscope (40X). Zinc was detected only at the steel-coating interface. The black epoxy and the clear polyethylene were in essentially separate layers over the zinc layer, with the polyethylene layer furthest from the steel panel.

The three component powder coating composition of this example, which is particularly preferred, is attractive for applications wherein a protective coating having excellent corrosion resistance is required. For instance, this coating may be used to coat the interior of underground oil or gas pipes. The zinc layer produces a galvanized finish on the interior of the pipe, and the epoxy layer overlying the zinc serves to protect the zinc from abrasion, as well as providing an integral coating of high corrosion resistance. Finally, the polyethylene layer serves as a non-conductor of electrical currents, preventing or minimizing electrolytic corrosion. For some applications, the polyethylene layer provides increased exterior durability, e.g. automobile wheel rims.

EXAMPLE II

This example was generally similar to Example I, with the exception that the coating ingredients were applied in two separate spraying operations, with no intermediate baking.

The Black Epoxy Powder No. 3 (95 parts by weight) and the zinc dust (5 parts by weight) of Example I were sprayed on a steel panel under the spraying conditions described for Example I. This composition was sprayed for 4 seconds, producing a 2.5 mil coating on the panel. Immediately thereafter, and with no intermediate baking or heating of the panel, a second coating was applied over the first coating. The second coating contained 30 parts by weight of the clear polyethylene powder and 0.15 parts by weight of the colloidal silica of Example I. The polyethylene composition was sprayed on the panel for a total of 5 seconds, producing a 2.0 mil coating.

Thereafter, the coated panel was placed in an oven having an initial temperature of 300° F. The temperature was increased at a linear rate for 10 minutes and until the temperature was 420° F, at which time the panel was removed from the oven and allowed to cool.

In visual appearance, the panel looked identical to the product of Example I, and a microscopic examination of a scratched and indented coating also indicated similar results.

EXAMPLE III

The coating powder used in this example had the following composition:

| | |
|---|---|
| White epoxy powder | 95 parts by weight |
| Zinc dust | 5 parts by weight |

The zinc dust was similar to that used in Example I. The white epoxy powder (hereinafter sometimes called White Epoxy Powder No. 1) had the following formulation:

| | |
|---|---|
| Shell EPON 1004 (similar to that of Example I) | 54.4% by weight |
| Dicyanamide | 1.3% by weight |
| Amine accelerator (same as Example I) | 1.3% by weight |
| Titanium dioxide | 43.0% by weight |

The above epoxy powder ingredients were dispersed in a high intensity dry blender until a homogeneous blend was obtained, extruded at 185° -200° F, and then reduced to a fine powder in a hammer mill. The particle size analysis of the resulting epoxy powder was as follows:

| | |
|---|---|
| Less than 37 micron | 0.47% |
| 38–44 micron | 0.78% |
| 45–74 micron | 2.22% |
| 75–150 micron | 49.59% |
| 151–300 micron | 16.81% |
| Over 300 micron | 0.13% |

The mild steel panel was similar to that of Example I, and the same electrostatic spray gun and spraying conditions were used, except the temperature was 75° F and the relative humidity was 42%. Immediately after the panel was coated, it was removed from the spray booth, and placed in an oven at 350° F for 3 minutes. Thereafter, the oven was rapidly heated to 380° F and the panel was held at this temperature for 10 minutes and then removed and allowed to cool. The resulting panel appeared similar in appearance to a panel coated only with White Epoxy Powder No. 1. No zinc was visible on the surface of the panel when examined under a microscope at 40X. One edge of the panel was sanded down and an examination of this edge under a 40X microscope revealed a layer of zinc at the substrate-coating interface. The total coating was about 2 mils thick with the zinc layer about 0.2 mil thick. The coating of this example could be used in a wide variety of coating apparatus, such as, for instance, as a coating on auto rocker panels, or other auto components, on tubular furniture, shelving, tools, etc., e.g., generally for interior uses, on the interior shell of refrigerators and other household appliances, on off-shore drilling rigs and other applications in marine use, and the like.

EXAMPLE IV

This example was similar to Example III, except the substrate was a glass panel. The same coating composition was utilized, and the spray conditions were the same as Example III. The glass panel (6 inches by 12 inches) was coated with Ransburg's trademarked preparation "Ransprep", a colloidal silica composition, which made the glass surface conductive. The glass panel was grounded during the spray operation.

The bake schedule used in this example was the same as that used in Example III. The panel appeared to be generally similar to the product produced by Example III. An examination of the film surface next to the glass revealed the presence of a continuous zinc layer. The outer surface of the coating appeared to be free of zinc when viewed under a 40X microscope.

EXAMPLE V

This example was similar to Example III except that a larger particle size, and slightly different zinc powder was utilized. The coating composition was the same as that used in Example III, with the exception that the zinc powder (New Jersey Zinc No. 444) had an average particle size of 6.3 microns. 99.3% of the zinc passed a 325 mesh screen. The zinc powder contained 96.0% metallic zinc, 3.9% ZnO, 0.07% Pb, 0.03% Cd, and less than 0.01% Fe.

The substrate, spray conditions, and bake schedule were the same as Example III with the exception that the room temperature was 78° F and the relative humidity was 40%.

The baked panel had a glossy white appearance, with no zinc visible on the coated surface when viewed under a 40X microscope. One edge of the panel was sanded down, and a microscopic examination (40X) of this edge indicated the presence of a zinc layer at the steel-coating interface.

EXAMPLE VI

This example was similar to Example V, except that a higher concentration of zinc was used. The coating system was of the following composition:

| | |
|---|---|
| White epoxy powder No. 1 | 92.5 parts by weight |
| Zinc powder | 7.5 parts by weight |

The zinc powder was the same as used in Example V. The substrate, spraying conditions, and baking conditions were the same as Example V.

The coated panel, after cooling, had a glossy white finish with no appearance of zinc on the coated surface when viewed under a 40X microscope. One edge of the panel was sanded down and microscopic examination (40X) of this edge indicated the presence of a zinc layer at the panel-coating interface.

EXAMPLE VII 95 parts by weight of a clear epoxy powder and 5 parts by weight of zinc powder (the same as the zinc powder used in Example I) were dry blended at room temperature until a homogeneous blend was obtained. The clear epoxy powder (hereinafter sometimes called Clear Epoxy Powder No. 2) had the following composition:

| | | |
|---|---|---|
| Shell EPON 1004, an epichlorhydrin-bisphenol A resin | 78.3% | by weight |
| Trimellitic dianhydride | 11.7% | " |
| Stannous octoate | 1.4% | " |
| Silica (325 mesh) | 8.4% | " |
| Monsanto PC 1344 defoamer | 0.2% | " |

The above ingredients, except the stannous octoate, were added to a pebble mill and ground for 16 hours. The stannous octoate was then added and the grinding continued for an additional 20 minutes. The resulting powder, after screening through a 200 mesh screen, had the following particle size analysis:

| | |
|---|---|
| Less than 37 micron | 0.0% |
| 38–44 micron | 1.1% |
| 45–74 micron | 98.9% |
| 75–150 micron | 0.0% |
| 151–300 micron | 0.0% |
| Over 300 micron | 0.0% |

The substrate was the same as in Example III. The spray conditions were the same as Example III, with the exception that the room temperature was 80° F and the relative humidity was 40° F. A simple bake schedule of 10 minutes at 380° was used. After the baked coated panel had cooled, no zinc could be visibly detected in the epoxy layer. The panel had a clear epoxy film overlying the zinc layer which was next to the metal substrate. The clear epoxy film was 2 mils in thickness, and the zinc layer was 0.2 mils thick. The coating was scratched and indented and then examined under microscope 40X. The zinc layer next to the steel substrate was clearly visible.

EXAMPLE VIII

This example relates to a protective coating of polyethylene and zinc applied to a steel substrate.

5 parts by weight of zinc powder, 100 parts by weight of clear 0.924 density polyethylene powder, and 0.5 parts by weight of colloidal silica were dry blended at room temperature until a homogeneous blend was obtained (The zinc powder, the clear polyethylene powder the colloidal silica were the same as used in Example I).

The blended powders were applied to a substrate which was similar to that used in Example I. The spray conditions were the same as used in Example I. Immediately after spraying, the coated panel was baked for 12 minutes in an oven, using an initial temperature of 275° F, with the temperature rising, at a linear rate, to 465° F at the end of the bake cycle. The resulting coating had a slightly textured surface, with a layer of polyethylene overlying a layer of zinc which was adjacent the steel surface. The polyethylene layer was about 5 mils thick and the zinc layer was about 0.4 mil thick. It is likely that modification of the above bake schedule would eliminate the textured nature of the coating, if so desired.

A resulting coating should be useful in a number of applications, including pipe coating, and the coating of metal furniture, fencing, and the like.

COMPARATIVE EXAMPLE A

This example is presented to illustrate that the present invention requires a homogeneous blend of discrete powders.

95 parts by weight of clear epoxy powder No. 2 and 5 parts by weight of the zinc powder used in Example I were pebble milled for 16 hours. The resulting blended powder appeared to contain agglomerated material, quite likely because of a substantial temperature rise during the pebble milling. The powder was electrostatically sprayed upon a steel substrate which was similar to the substrate of Example VII. The spraying conditions and the bake schedule were the same as used in Example VII. The resulting panel had a 3 mil thick clear coating thereon which contained zinc particles dispersed regularly throughout the film. There was no stratification of the coating components and no evidence of a continuous layer of zinc.

Thus, this example illustrates that the powders of the different components must be substantially discrete in order to produce a plurality of coating material layers.

COMPARATIVE EXAMPLES B AND C

There examples are presented to illustrate that the use of a conductive metal having a specific gravity below the ranges contemplated by the present invention results in a system wherein the metal migrates to the outer surface of the coating — that is, away from the substrate-coating interface.

Both Examples B and C set forth below involve the coating of solvent washed mild steel panels 4 inches × 6 inches × ⅛ inch, with no preheating. The powdered coating composition was sprayed using a Gema Gun, manufactured by Gema A.G., St. Gallen, Switzerland, and distributed by Interrad Corporation, Greenwich, Connecticut. The Gema Gun is basically similar to the Ransburg gun used in the preceding examples except the charging electrode is located in the barrel, which is made of plastic. The maximum applied voltage, 52,000 volts, was used in each comparative example. The pump and motor pressures were not adjustable on this equipment. After coating the panels, a simple bake schedule of 10 minutes at 400° F was used.

COMPARATIVE EXAMPLE B

A dry blended mixture of a clear epoxy resin powder of less than 75 microns having the following formulation:

| | % By Weight |
|---|---|
| Epoxy Resin (Epon 1004) | 121.375 |
| Trimellitic Anhydride | 16.67 |
| Stannous Octoate | 1.97 |
| Low molecular weight silicone oil (same as Example I) | 1.125 |

was blended with "Rich Gold", an Alcan Metal Products copper/zinc alloy having a density of 2.8 g/cc. and an average particle size of 30–60 microns, in an amount of 94% by weight epoxy to 6% by weight alloy. The blended powdered composition was sprayed using the above-described Gema Gun, upon the mild steel panels, which were grounded. Spraying was conducted at 80° F and 50% RH. The resulting film was 2.9 mils thick. The panel, after spraying and before baking, looked as though it had been dusted with a translucent talc. After baking, the panels had a gold metallic flake appearance with a metallic gloss.

This experiment was repeated, except the above alloy was replaced with a corresponding amount of "Palegold 6500", made by United States Bronze and having a similar particle size and density. A film thickness of 3.0 mils was obtained, and after baking, the panel had a flat gold finish having a somewhat antique appearance, with a moderate gloss.

In both cases, substantial migration of the copper/-zinc allow to the film surface was noted.

COMPARATIVE EXAMPLE C

A dry blended (blended on a roll rack overnight) powder composition consisting of 99.5% of the Black Epoxy Powder No. 3 of Example I and 0.5% aluminum powder, sold under the trade identification M224 by Alcoa and having an average particle size of 3–30 microns, a density of 2.7 g/cc and a purity of 97%, was used in this example. The Gema Gun described in Comparative Example A was used in this experiment, and the powder composition was applied to a solvent washed steel panel, 4 inches × 6 inches × ⅛ inch, with preheating. The composition was sprayed at 82°–83° F and 55–56% RH. After coating and before baking, a slight indication of the presence of aluminum was noted on the surface of the panel. After the baking (10 minutes at 400° F), the panel had a smooth finish with more aluminum being visible on the surface. The film thickness was 2.8 mils.

This example was repeated with 1% by weight of aluminum powder in the blended mixture. Before baking, the panel appeared similar to that described above. After baking, the panel appeared to definitely have more aluminum on the surface than the panel coated with 0.5% aluminum powder. It was estimated that essentially the total amount of the aluminum in the coating composition was located in the upper surface of the film, which was 3.0 mils thick.

Comparative Example C was repeated, except 2.0% aluminum powder was used in the coating composition. After baking, the film which was 2.8 mils thick, was completely silver in color and had a slight roughness. Before baking, the panel appeared similar to those described above.

Comparative Example C was repeated again, this time with 4.0% aluminum powder in the coating composition. A film having a coating of 3.9 mils was obtained which had an extremely rough finish. It was estimated that essentially the total amount of aluminum in the coating composition was on the upper surface of the film, that is, on the side of the film furthest from the substrate.

The explanation for the migration of the aluminum and the copper/zinc alloys in the above comparative examples has not yet been established, and could be due to a number of factors. In any event, the present invention does not contemplate using powders in the coating composition which exhibit such substantial migration during the baking or curing operation.

The coating composition of the above examples were applied by means of an electrostatic spray gun. However, the results obtained suggest the use of a number of other electrostatic coating methods, including electrostatic fluidized bed coating and electrostatic fluidized bed spray coating, could be used. Generally, the process conditions (particle - substrate charge differential, coating powder admixture composition, and the like) will be somewhat similar to the conditions found useable for the electrostatic spray gun, as known to the art.

The above examples and the process conditions set forth hereinabove are based upon the use of a Ransburg electrostatic spray gun, as described in Example I above. Thus, these conditions are quite specific for the Ransburg type electrostatic spraying equipment, as is well known to the art. Naturally, other types of electrostatic coating equipment may be utilized with corresponding changes, when required, in the processing conditions, as is well known to those having ordinary skill in the coating art. For instance, at least one commercially available electrostatic spray gun has no air pump, and thus any reference to the Ransburg air pump pressure would be meaningless if such other equipment were used.

In most uses of the coating method of the present invention, the final coated article, or product, will have thereon a coating containing superimposed layers of the components of the initial powdered coating composition. In other words, it is generally desired to have all of the materials in the powdered coating composition mixture appear in one or more layers of the final coating. However, it may be desirable in some instances to remove one or more of the components of the coating composition from the final coating. For instance, it may be desirable to subject the coated article to a high temperature bake to burn out the organic polymer therein. Such a step might be used wherein an electrostatically applied coating of zinc alone is desired (the zinc alone could not be electrostatically sprayed due to shorting of the electrostatic equipment, but electrostatic spraying might be the only practical method of coating a surface which is in a location difficult to reach).

As mentioned previously, it is exceedingly difficult, if not impossible, to accurately measure the charge imparted to a polymer particle during the electrostatic spraying operation, and, in any event, it is believed that such determination is impractical for field applications. However, a rough guideline will be the strength of the electrical field through which the powder particles pass in operation of the electrostatic coating apparatus, and the charge imparted to the conductive substrate (it will be realized that the substrate may merely be grounded, as discussed hereinabove). In most instances, it will be sufficient to use the voltage settings described above for operation of the Ransburg type electrostatic spray gun, or equivalent settings on other types of electrostatic coating apparatus, with a grounded substrate. With substrate charging, an equivalent differential between the substrate charge and the particle charge should be roughly observed. In any event, the differential between the charge on the substrate and the charge imparted to the polymer particles should be such that a substantial portion of the powder particles are attracted to, and deposited upon, the substrate, and thereafter remain on the substrate for a period of time necessary to effect the at least partial fusing or curing of at least one of the coating component materials.

We claim:

1. An article of manufacture consisting essentially of a conductive substrate and, adjacent and overlying said conductive substrate, a coating comprising a plurality of superimposed, distinct layers, the layer next to the conductive substrate consisting essentially of a layer of conductive metal selected from the group consisting of iron, stainless steel, zinc, copper, nickel, tin, chromium, brass, titanium, zirconium, lead and alloys of these metals, at least one of said layers consisting essentially of at least one first film-forming non-conductive organic or inorganic polymer, the specific gravity of said conductive metal being at least three times that of said first polymer, said coating being applied to said conductive substrate in one step by electrostatically applying an admixture of powders, said admixture including powders having average particle sizes less than 50 microns of said conductive metal and powders having average particle sizes of about 10 to 300 microns of said first polymer, whereby said powders stratify into distinct, overlying layers, and thereafter curing or fusing at least one of said powders, whereby the superimposed layers of the coating exhibit improved adhesion as compared to similar articles wherein the coating layers are separately applied and cured or fused.

2. Article of claim 1, wherein the conductive metal layer is about 4 to about 30% by weight of the weight of said coating.

3. Article of claim 1, wherein said first polymer is an organic polymer.

4. Article according to claim 1, wherein said first film-forming non-conductive organic or inorganic polymer is a thermosetting or thermoplastic organic polymer.

5. Article according to claim 4, wherein said polymer is a thermosetting organic polymer.

6. Article of claim 1, wherein said first polymer is an epoxy polymer, said metal is zinc.

7. Article according to claim 6, wherein the zinc is present in an amount less than 7 1/2% by weight of said coating.

8. Article of claim 1, wherein said coating comprises at least three layers, at least one of the layers consisting essentially of at least one second film forming non-conductive organic or inorganic polymer, wherein the second polymer has a dielectric constant which is at least 0.1 lower than the dielectric constant of the first polymer, and the specific gravity of the second polymer is at least 0.1 lower than the specific gravity of the first polymer.

9. Article according to claim 8, wherein one organic polymer is a thermosetting organic polymer, and the other organic polymer is a thermoplastic organic polymer, the layer of said metal being about 5 to about 12% by weight of said coating, the layer of thermosetting organic polymer being about 55 to about 75% by weight of the weight of said coating, the weight of said thermoplastic polymer layer being about 20 to about 40% by weight of said coating wherein the thermosetting organic polymer has a dielectric constant which is at least 0.1 higher than the dielectric constant of the thermoplastic organic polymer, and the specific gravity of the thermosetting organic polymer is at least 0.1 higher than the specific gravity of the thermoplastic organic polymer.

10. Article according to claim 9, wherein said thermosetting polymer is an epoxy polymer, and said thermoplastic polymer is polyethylene.

* * * * *